Figure 5:
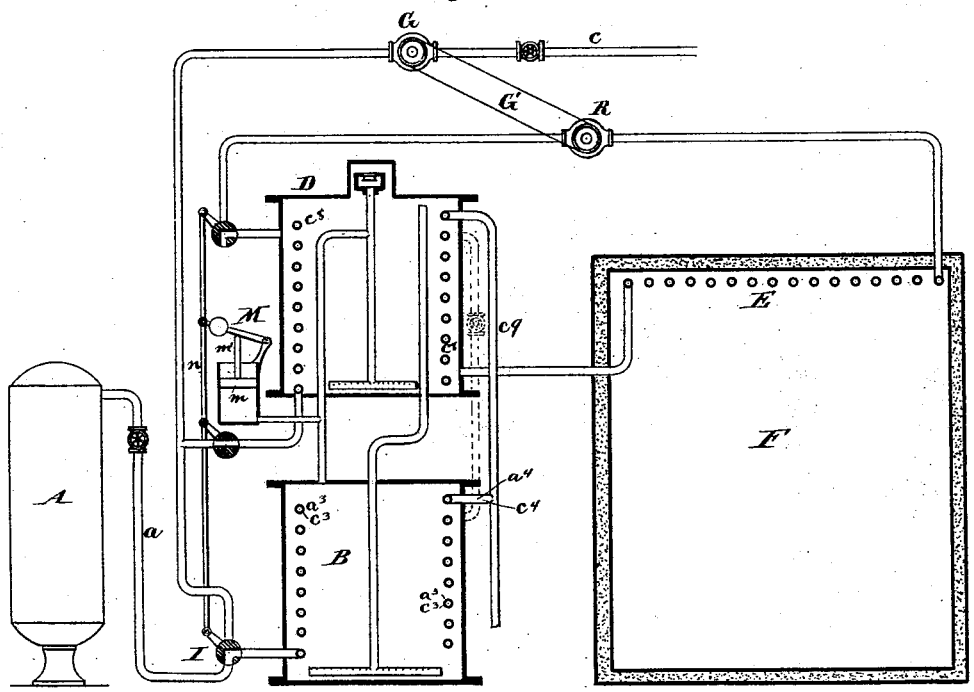

(No Model.) 3 Sheets—Sheet 1.
A. SIEBERT.
REFRIGERATING APPARATUS.
No. 489,335. Patented Jan. 3, 1893.
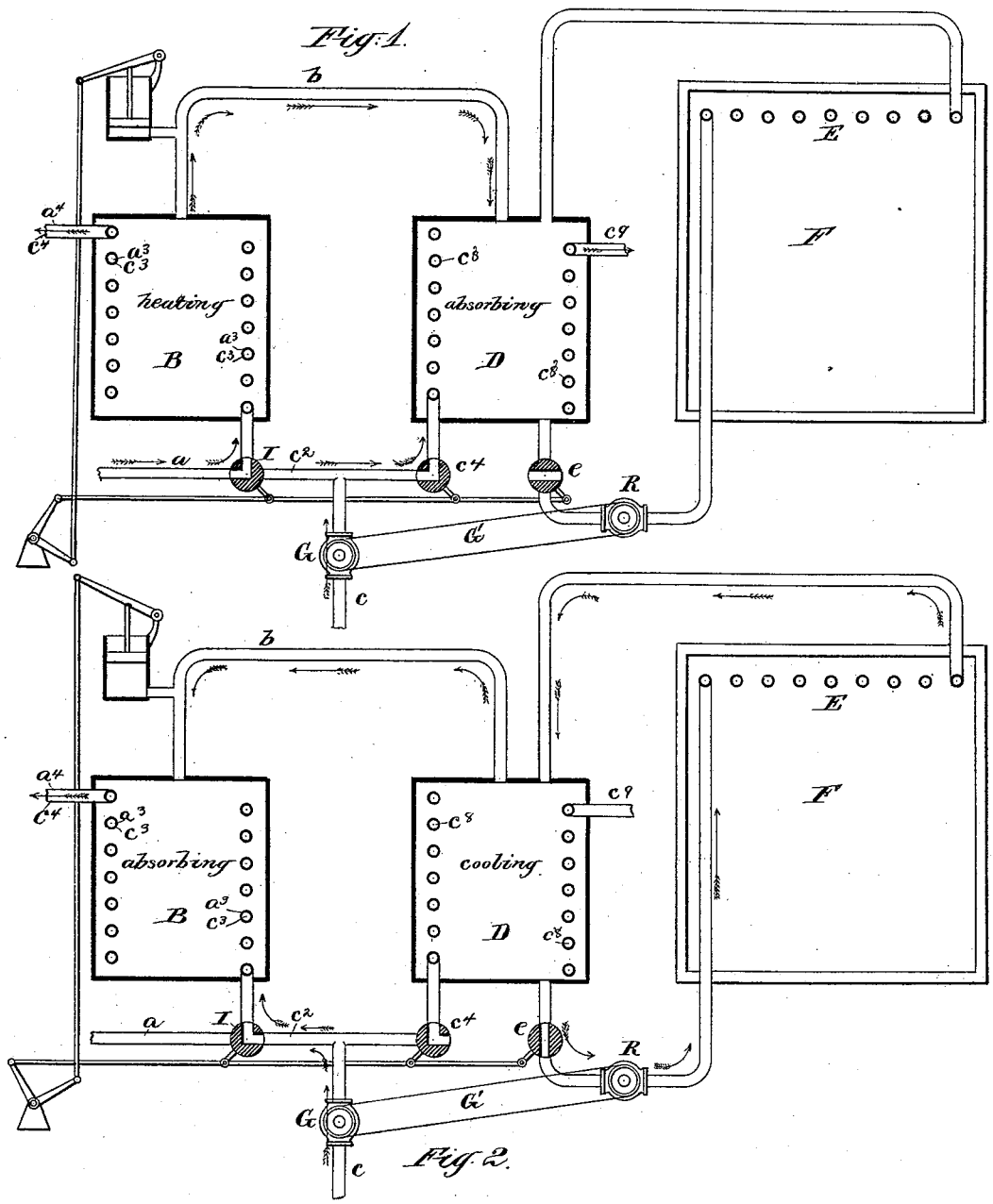

(No Model.) 3 Sheets—Sheet 2.
A. SIEBERT.
REFRIGERATING APPARATUS.
No. 489,335. Patented Jan. 3, 1893.
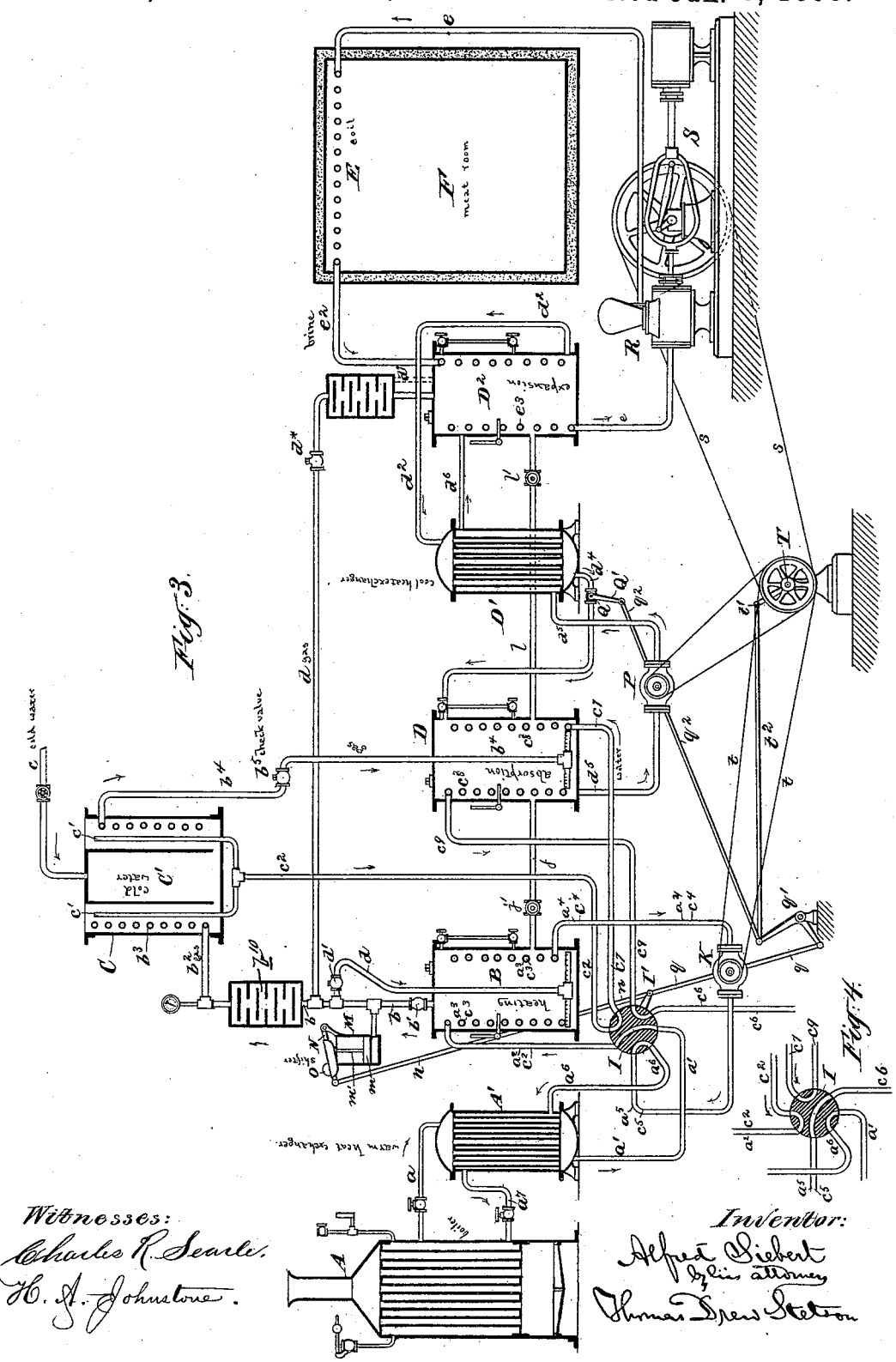

(No Model.) 3 Sheets—Sheet 3.

A. SIEBERT.
REFRIGERATING APPARATUS.

No. 489,335. Patented Jan. 3, 1893.

Witnesses:
Charles R. Searle
H. A. Johnstone

Inventor:
Alfred Siebert
by his attorney
Thomas Drew Stetson

UNITED STATES PATENT OFFICE.

ALFRED SIEBERT, OF NEW YORK, N. Y.

REFRIGERATING APPARATUS.

SPECIFICATION forming part of Letters Patent No. 489,335, dated January 3, 1893.

Application filed June 22, 1888. Renewed November 30, 1892. Serial No. 453,575. (No model.)

*To all whom it may concern:*

Be it known that I, ALFRED SIEBERT, of New York city, in the county and State of New York, have invented a certain new and useful Improvement in Refrigerating Apparatus, of which the following is a specification.

My apparatus may work with other volatile agents, but I prefer ammonia, and will describe the invention as used with this cheap and very efficient agent.

My apparatus and process belongs to the absorption class, it uses absorption pure and simple. Since I use warm water of perhaps 160° Fahrenheit, not steam, it is possible to utilize fuel more efficiently than steam boilers because the gaseous products of combustion can leave my furnace with a lower temperature. It is better to use water only moderately hot for the reason among others that the metal of the several pipes and vessels, after having been heated, has to be cooled again, and the heat thus expended and afterward taken out by the cooling water is wasted. Water absorbs ammonia in large quantities, varying very greatly with the temperature. Water at 77° Fahrenheit will hold six hundred volumes, as established by business results on a large scale. Tellier states that at 140° Fahrenheit it will hold practically no ammonia. Thus it is apparent that by properly heating or cooling partially saturated water in the presence of ammonia, this volatile element can either be expelled or absorbed.

I will in this specification use the term "gas" in conformity with general usage in referring to the vaporized or gaseous condition of ammonia.

It has been ascertained by experiments [Favre and Silbermann] that at ordinary temperatures and pressures the sensible heat generated by the absorption of ammonia in water is constant, and equal to nine hundred and twenty-six thermal units per pound of ammonia absorbed. I have devised an efficient apparatus in which low pressure, say only about thirty pounds per square inch absolute may be used or the pressure may be anywhere from one hundred and fifty to two hundred pounds. I will first describe a very simple form and afterward a more complete form of the apparatus. Supposing any ordinary or suitable arrangement of pipes to be provided in the top of a refrigerator, meat-box or other building, apartment or structure of whatever character in which the cold is to be utilized, my invention provides for circulating through such pipes either continuously or at short intervals a current of water at a low temperature. The water may, if desired, be saturated with ammonia, salt or glycerine, or there may be other suitable provision taken to prevent it from being ever frozen by too great lowering of the temperature by an accidental derangement of the apparatus, or otherwise. The pipes through which the water is to be thus circulated communicate with a vessel which I will term the absorption vessel. It may be a rectangular case holding anywhere from a few gallons upward. In this latter case or vessel is a coil through which water at ordinary temperatures may be circulated from the street mains, or from a spring, well or river so as to carry away the heat during the period while the temperature of this vessel is above the ordinary. During such period the circulation from the absorption vessel through the coil in the refrigerator is stopped. Such period is followed by another during which the temperature of the water in the absorption vessel stands low. During the latter period the water from the absorption vessel is caused to circulate actively through the pipes in the refrigerator and effects the lowering of the temperature. These changes of the condition in the absorption vessel are brought about through agencies which will now be described. There is another vessel which may be of the same size as the absorption vessel, and mounted at any convenient distance therefrom, which I will term the heating vessel. This has a coil through it which is equipped with provisions for circulating therein alternately either hot or cold water. The top of the heating vessel is connected with the absorption vessel by a pipe or connection which is of ample size to allow of a free flow of the vaporized ammonia either in the one direction or the other. Before starting the apparatus, both the vessels,—the absorption vessel and the heating vessel,—are filled nearly to the top with water, which is impregnated with ammonia; but this must not be done up to the point of saturation for reasons which will presently appear. Now assuming the condition of the water in the two vessels to be alike,—a uniform partial saturation with ammonia, an ordinary temperature and a pressure but little if at all above the ordinary atmospheric,—I circulate a current of hot water through the coil in the heating vessel, and a current of cold water through the coil in the absorption vessel. This raises the temperature of the water in the heating vessel and drives out the ammonia which flows rapidly in the form of vapor through the connecting pipe, and is absorbed by the water in the other,—the absorption vessel. This absorption of ammonia tends to raise the temperature in the latter vessel, but the current of cold water circulating through the coil in this prevents its becoming much raised. After this condition has obtained until nearly all the ammonia is driven out of the heating vessel, and is absorbed in the absorption vessel, a change in the condition is made. The flow of hot water through the coil in the heating vessel is stopped, and a flow of cold water is substituted through that coil. The flow of cold water through the coil in the absorption vessel is also stopped. Thus conditioned, the temperature of the heating vessel is rapidly lowered. Now the ammonia which is in excess in the absorption vessel flows back through the top connection and is absorbed by the water in the heating vessel. This operation lowers the temperature of the water in the absorption vessel, and the water now becomes available for cooling the refrigerator. It is circulated through the pipes going to the refrigerator very cold and coming back partly warmed. This state of things continues until the excess of gas in the water in the absorption vessel is nearly all expelled, and has been absorbed by the only slightly warm water in the heating vessel. Now the conditions are again changed to those described at the beginning. That is to say, the circulation between the absorption vessel and the coil in the refrigerator is stopped, cold water is shut off, and hot water is let on to flow through the coil in the heating vessel, and cold water is allowed to flow through the coil in the absorption vessel. Now the ammonia again flies over in the form of vapor from the heating vessel into the absorption vessel until nearly all the gas is again in the water in the absorption vessel, and the excess of heat therein is again carried away by the stream of water at ordinary temperature flowing through its coil, then the conditions are again reversed, and so on.

I use the term "water" to designate the liquid which alternately absorbs and yields up the volatile agent. I prefer for economic and other reasons water of ordinary purity; but other liquids may be used as equivalents. I use the term "ammonia" to designate the volatile agent employed which is alternately absorbed and again evaporated. I prefer ammonia; but other fluids may be used which possess the property of being absorbed and given off. I consider such the equivalents of ammonia.

In all ordinary ammonia-apparatus the gas is raised to a high tension, say one hundred and sixty pounds per square inch, either by heating water containing it to a high temperature in a still, and thus forcibly expelling it, or by mechanically compressing it, and then after the cooling water has bathed the tubes of the condenser and carried away much of its heat, the ammonia is allowed to mechanically expand and produce the intense cold required. If the reduced temperature induced by the cooling water is 86°, liquefaction of the ammonia will take place whenever one hundred and fifty pounds pressure above the atmosphere is reached or exceeded. Its refrigerating action in again expanding into the gaseous form is very great, but the high temperatures and pressures required involve difficulties which my invention avoids. I use only the excess of ammonia with which the water is charged above that which it can retain at the temperatures and pressures to which the water is subjected. This gives efficient refrigeration with very moderate heating and moderate pressures.

The accompanying drawings form a part of this specification, and represent what I consider the best means of carrying out the invention.

Figure 6:
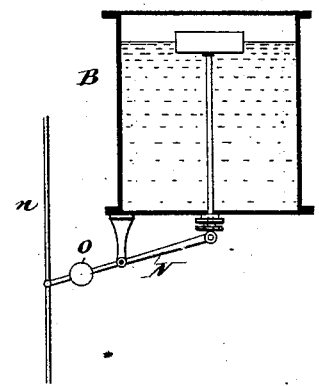
Figure 7:
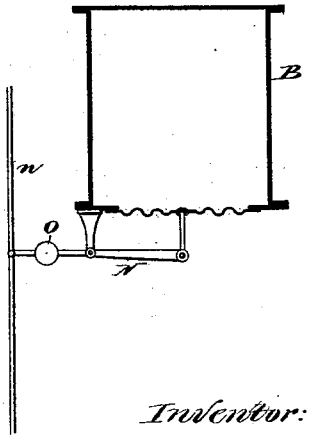

Figures 1 and 2 are outline diagrams representing the simplest form of the apparatus in elevation, with the motion of the fluids indicated by arrows. Fig. 1 shows the conditions which obtain while the absorption vessel is becoming charged with gas. Fig. 2 shows the same apparatus under the conditions which obtain while the gas is allowed to expand from the absorption vessel, and the temperature therein is low. During this period the chamber which is to be cooled, and which sometimes I call the refrigerator, is lowered in temperature by the circulation of very cold water from the absorption vessel. The heat in the refrigerator thus transferred to the absorption vessel is rapidly carried away by the volatilization of the ammonia therein as it assumes the form of vapor and flows over into the heating vessel there to be absorbed. Figures 3 and 4 show a more elaborate set of apparatus. In these figures the water of a boiler is used for heating, while the same boiler furnishes steam power to operate the pumps to cause circulation, and for any other purpose required. Fig. 3 is a vertical section partly in elevation, showing the entire apparatus. Fig. 4 is a vertical section showing a portion under different conditions. Fig. 5 is a vertical section showing an apparatus adapted for domestic use. Figs. 6 and 7 are vertical sections showing modified forms of the shifting device.

Referring to Figs. 1 and 2, F is the meat room to be cooled, E the coil of pipes therein, and $e$ a valve, which I will describe as an ordinary stop-cock, though various forms of more easily worked valves may be substituted. R is a pump, introduced at any convenient point in the circuit to promote the active circulation of the water through the coil E during the period while the valve $e$ is open. D is the absorption vessel, and $c^8$ a coil of pipe therein. The coil is provided with a cock $c^4$. It will be understood that the terminal pipe $c^9$ may be open to allow the cold water after it has taken up heat in the absorption vessel during the warm period thereof to flow away and be either allowed to go to waste or utilized for any purpose for which warm water is desired. G is a motor-wheel suitably mounted in the pipe $c$, leading from a street main or from an elevated reservoir or other source of cold water which affords the supply for the pipe $c^8$, and also for a branch-pipe $c^2$ which at certain periods supplies a coil in the heating vessel with cold water to abstract heat as will presently appear. No pressure is needed in either the coils $c^3$ or $c^8$ further than that required to overcome the slight resistance to the passage of water through the pipes. Any excess of pressure available in the pipe $c$ due to the pressure in the street main, or from the elevated reservoir, is utilized in turning the motor G. A belt G' communicates motion from this motor G to the rotary pump R, and thus supplies the power therefor. B is the heating vessel, and $b$ is the pipe which connects the top of this vessel with the absorption vessel D. This pipe $b$ is always open. There may be a cock in it to allow closing when desired, as to facilitate repairs, but under ordinary conditions any such cock would stand constantly open. I employ a coil of pipe marked both $a^3$, $c^3$, traversing the water in the heating vessel B, and through which hot or cold water is circulated alternately. I is a three-way cock, which as it is partially turned in one direction or the other puts this coil $a^3$, $c^3$, alternately in communication, first with the cold water pipe $c$ to lower the temperature, and next, with the hot water pipe $a$ coming from any efficient heater. For family use the hot water may come from the water-back in the kitchen range with or without the intervention of the ordinary hot water reservoir. The open end of the coil $a^3$, $c^3$ is marked $a^4$, $c^4$. Through this coil the water may ascend whether it enters hot from the pipe $a$ to heat the heating vessel, or enters cold from the pipe $c$ to cool the same. This water may be wasted or utilized for any purpose after its traverse through $a^3$, $c^3$.

The invention is intended more particularly for operating on a small scale, as in retail meat stalls, or even on the still smaller scale required for refrigerators for hotels, restaurants, and large or small families. I do not confine the invention to any particular size of apparatus, or any particular purpose. It may be useful wherever refrigerating is desired.

I provide an automatic device for turning the cocks and changing the condition of the apparatus at certain periods, which will be explained in connection with another form of the apparatus.

I will now describe a more elaborate form of the apparatus. In case a steam boiler is to be used, as for example where such is already on hand or is necessary for supplying steam to the circulating pumps and water pumps, the hot water can be taken from the boiler and led through an interchanger where it will exchange heat with the water returning to the boiler, and so be regulated to just the proper temperature. Figs. 3 to 7 inclusive represent such an apparatus with all the provisions fully shown, or sufficiently indicated to enable those skilled in the art to properly construct and operate the apparatus. In the figures, A represents a boiler, in this case an upright tubular boiler; but any other kind of boiler could be used. The pipe $a$ furnishes hot water for the heating vessel B, and the pipe $a^7$ returns such water after use to be again heated in the boiler. A' represents a heat exchanger consisting of a cylindrical vessel with tubes traversing it which are expanded to form tight joints at both heads of the vessel, and two caps bolted on, one to each head of the vessel. The top cap distributes the water from the pipe $a$ through the tubes in the exchanger, where it gives up a portion of its heat. The bottom cap collects this water again and delivers it by the pipe $a'$ at about the temperature desired, say 160° Fahrenheit. The returning water which receives the excess of heat from this water in its passage through the exchanger enters laterally near the lower end of the exchanger through pipe $a^6$, and leaves near the upper end through pipe $a^7$. B represents the heating vessel, an upright cylindrical vessel traversed by a coil, doubly marked $a^3$, $c^3$, to indicate its double function of heating and cooling, which latter is connected to pipes $a^2$, $c^2$, and $a^4$, $c^4$. The top head has two openings, one for allowing the gas to flow out through pipe $b$ past the check-valve $b'$; the other for allowing gas to enter at another period through pipe $d$, with check-valve $d'$ interposed. The latter pipe reaches nearly to the bottom of the vessel B, where it distributes the gas through one or more perforated pipes which allow it to rise in small bubbles and be readily absorbed. The pipes $b$ and $d$ are connected above or beyond their respective check-valves $b'$, $d'$, to the shifter M. Above this the pipes again divide. The pipe $b$ which leads gas away enters the liquid-catcher, a vessel provided with baffle-plates designed to retain any particles of water carried mechanically upward with the gas; and the pipe $d$, which at another period brings the returning gas, connects through the check-valve $d^*$ from a distant vessel, to be presently described. The shifter M consists of a cylinder with a piston $m$, having the piston-rod $m'$ attached to a lever N, which carries a freely rolling weight O which moves outward and inward as the lever is inclined in one direction or the other, and thus by its gravity contributes to insure a prompt action. This lever N is attached by a rod $n$ to a set of valves shown as cocks, but preferably easily worked valves. They serve as reversing means to change the conditions of the apparatus at intervals. C represents the gas-cooling vessel. It contains a coil $b^3$ connected to pipe $b^2$, at one end, and to pipe $b^4$ at the other end. From near the top of this vessel C a pipe $c^2$ with its two branches $c'$, $c'$, allows the water furnished cold by a pipe $c$ to leave, and carry away the heat. The cold water received in the internal cylinder $C'$ rises upward around it, and cools the gas circulated through the coil $b^3$, leaving finally by pipes $c'$ and $c'$. The pipe $b^4$ connects past a check-valve $b^5$ to a perforated distributing pipe in the bottom of the absorption vessel D, which latter contains a coil $c^8$ connected at one end to pipe $c^7$, which brings water, and at the other end to pipe $c^9$ which leads it away. $D^2$ is an expansion vessel. The intensely low temperature required is produced by the evaporation of the excess of ammonia in $D^2$. The pipe $d^2$ conveys the impoverished solution from the base of $D^2$ into the top cap of $D'$, urged by the rotary pump P. The pipe $d^4$, provided with stop-cock Q, allows the slightly warmed solution to flow from the bottom cap of $D'$, which is a heat-exchanger similar to the one described in connection with the boiler, to vessel D, while the charged solution from D moves through pipe $d^5$ into the lower part of the body of $D'$, leaving colder at the upper part of the body by pipe $d^6$, and entering the expansion vessel $D^2$, which latter contains a coil $e^3$ which is connected at one end to the pipe $e^2$, conducting brine or other non-congealing liquid from the coil E in the chamber F which is to be cooled. The other end of the coil E connects to the pipe $e$ which leads to the circulating pump R by the action of which the liquid brought at a very low temperature from $D^2$ is constantly impelled through the pipe $e$ and coil E cooling the chamber F for any useful purpose desired.

The two conditions in which the apparatus works will be set forth in detail further on. I have before explained that the heat developed by the absorption in B is taken away by a current of cold water which is led during this period through the coil $a^3$, $c^3$. When the water in B is well saturated, the conditions are again changed by operating certain valves, and hot water instead of cold is led through the coil $a^3$, $c^3$, raising the temperature of the water in B and again expelling the gas. The steam-engine S not only drives the pump R, but also furnishes power by means of belts and pulleys to the rotary pumps P and K to drive them alternately, the changes being effected by means of counter-shafting T, with loose pulleys and belt-shifting or friction wheel devices. The rotary pump P is interposed in pipe $d^5$, and circulates the water between the absorption vessel D and the expansion vessel $D^2$ passing on the way through the heat-exchanger $D'$. The rotary pump K is interposed between pipe $a^4$, $c^4$ and $a^5$, $c^5$, and circulates the water between the boiler A and the heating vessel B through the heat-exchanger $A'$.

I is an eight-way cock for distributing the water warm and cold at the proper times to the proper coils and vessels. Attached to the plug of I is a lever $I'$ operated by the shifter M by means of a rod $n$. The cock Q in pipe $d^4$ is also operated by the shifter M by means of lever $Q'$, lever-rod $q^2$, bell-crank $q'$ and rod $q$ attached to the lever $I'$ of cock I. To the upper arm of the bell-crank lever $q'$ is attached another rod $t^2$ which operates a shipper $t'$ to shift the belt $t$ from a fast to a loose pulley or back again at each change induced by the shifter M, so as to start and stop the rotary pump P at the required period Operation: This apparatus, like the simpler one shown in Figs. 1 and 2, works alternately in two different conditions. I will first describe the condition during the charging period while the partially saturated water is being heated in B and the gas is being expelled from B and absorbed in D. The hot water leaves the boiler by pipe $a$ and flows through the tubes in the heat-exchanger $A'$, where its temperature is lowered. It leaves by a pipe $a'$ and connects through cock I to pipe $a^2$, $c^2$, which conducts it through the coil $a^3$, $c^3$, in B, heating the solution therein, and leaving the coil by pipe $a^4$, $c^4$, propelled by rotary pump K, the belt $s$ from fly-wheel of engine S now driving the pulley of counter-shaft T, which again by a belt $t$ drives the pulley of K, while the loose pulley carrying the belt to drive rotary pump P stands still. The pipe $a^5$, $c^5$, connects through cock I and pipe $a^6$ to the space between the tubes in the heat-exchanger $A'$, here taking up some of the heat which the water leaving the boiler by pipe $a$ gives it, and flows through the pipe $a^7$ to the boiler only a little less hot than the water in the boiler. The gas which is expelled by the heating of the solution in B flows through check-valve $b'$, $b$, and liquid-catcher, and pipe $b^2$, and enters the coil $b^3$ in the gas-cooling vessel C. The cooled gas leaves the coil $b^3$ in C by pipe $b^4$, passing the check-valve $b^5$, and issues from the distributer at the lower end of pipe $b^4$, and rises through the solution in D, charging it while the heat of absorption is taken away by cold water circulated through the coil $c^8$ in D. The water for this coil is supplied by pipe $c^7$. I have shown the apparatus as using the partially warmed water after it has cooled the gas in C, but this may be varied. The pipe $c^9$ carries away the warmed water after it has passed through the coil $c^8$ and allows it to waste through cock I and pipe $c^6$, which leads it to the sewer. While the solution is being heated in B and the gas expelled, the pressure of the gas increases. This is due to the fact that the solution in D is partly saturated. The cooling effected by an active circulation of cold water through the coil $c^8$ can at best only carry away the heat developed by the absorption of ammonia. The water can only be induced to absorb more ammonia by an increase of pressure. This increase of the pressure will continue until the solution in B is heated to a temperature at which most of the gas has been expelled. This temperature can be regulated at will by increasing the weight of the rolling-ball O, or lengthening the lever N. Care must be taken to have the rolling or shifting weight O just heavy enough, so that when this required pressure is reached a little further increase will raise the piston, and with it the lever N until the rolling weight O moves inward. The pressure below the piston will then be able to lift the lever N farther, and with it the lever I' attached to cock I, and through the rods $n$ and $q$, and bell-crank lever $q'$ and rod $q^2$ to turn the lever Q' attached to cock Q. The ports in I are so arranged that when the lever Q' of the cock Q has accomplished its entire movement to the right, these coil outlets are also shut off, and the apparatus is now ready to perform its second operation, which is the portion of the working in which the cold is utilized. It is initiated by the rising of the piston-rod $m'$ and rolling inward of the ball O, and the consequent shifting of the cock I and opening of cock Q.

Second operation: The hot water from pipe $a$ could now only enter A', leave it by $a'$, and connect through cock I to pipe $a^6$, going through A' again (but this time through the interior of the shell), and entering by means of pipe $a^7$ to the boiler. [See Fig. 4.] While this state of things continues the hot water performs no work. The cold or but slightly warmer water from pipe $c^2$ connects through cock I now to pipe $a^2$, $c^2$, [Fig. 4,] and flows through coil $a^3$, $c^3$, in B, leaving by the pipe $a^4$, $c^4$, and impelled by rotary pump K flows through pipe $a^5$ $c^5$ and cock I to pipe $c^6$, [see Fig. 4,] which leads it into the sewer, or into a storage tank if it is desirable to use the water for other purposes. The solution in B soon being cooled to the same temperature as it had before the heating had taken place, the cold water circulation through D being cut off is now capable of absorbing as much gas as had been expelled before by the heating. Check-valve $b^5$ prevents any gas from leaving D by pipe $b^4$; but since we have connections to tank $D^2$, and rotary pump P is working, which before was stopped, the rotary pump will force the solution in D through pipes $d^5$ into the lower part of D', and out again at the upper part, through pipe $d^6$ into vessel $D^2$, forcing at the same time the solution primarily in $D^2$ through pipe $d^2$ into upper cap of D' down through the tubes therein, here exchanging its low heat with the liquid from D, leaving by the lower cap of D' through pipe $d^4$, stop-cock Q now being open, and entering vessel D near the top. $D^2$ is connected by pipe $d$ through liquid-catcher and check-valve $d^{\times}$ to pipe $b$, and since pipe $d$ connects through check-valve $d'$ to the interior of the vessel B, the gas will enter through the distributer at the end of pipe $d$, and rising upward afford to the liquid in B the best chance to absorb it. While the solution in $D^2$ is evaporating its gas, it must naturally and very greatly lower its temperature, and it will do it sufficiently to cool the uncongealable liquid not only during the expansion period but also while the solution in $D^2$ is at rest. The uncongealable liquid is forced through coil E in F by means of pump R entering the coil E by pipe $e$, and leaving it by pipe $e^2$, thus effecting refrigeration in F. It will now be apparent why the heat exchanger D' should be used, since if the expansion and absorbing would be done in one vessel only—say in D, the cooling water in coil $c^8$ in D would first have to heat the solution in D to its own temperature, and thus reduce the efficiency before effecting a cooling; but with the exchanger the solution in $D^2$ can always remain cold while the solution in D will not lower its temperature materially below the temperature of the cooling water. Any water collected in the liquid catcher above $D^2$ may also be returned to $D^2$ through a pipe $d^7$, shown in dotted lines, if so desired. The pressure is now being reduced more and more until the point is reached at which the rolling or sliding weight O on lever N will move outward and supply the power to turn the levers on cocks I and Q, also to shift the belts on T, and the first operation commences again exactly as described before. These changes continue indefinitely. The glass gages will always show the levels of the solution in the tanks, and stop-cocks will allow to make all the equalization necessary. Thermometers might be supplied for tanks B, D, $D^2$, and pipes leading to and from the second or coldest heat-exchanger D', if so desired, which would help to control the actions of the apparatus; also a pressure-gage placed above the nozzles in the tanks B, D and $D^2$ might be of service. A pipe $j$ connects the heating vessel B directly to the absorption vessel D controlled by a cock $j'$. A pipe $l$ similarly connects the vessel D directly to the expansion vessel $D^2$ controlled by a cock $l'$. Under all ordinary conditions the cocks $j'$ and $l'$ are kept closed but when from any cause there is found to be too much of the solution in any vessel the proper cocks may be opened a few seconds the solution flowing through and effecting the proper distribution.

Modifications may be made without departing from the principle or sacrificing the advantages of the invention. If sufficient exhaust steam can be had from other sources, such steam could be used to heat the water to the desired temperature by the aid of a heat-exchanger. Or, if the combustion gases of a boiler after having generated steam could be further utilized to heat the water, I think if steam is used to operate the water pump and circulating pump, the exhaust of both might be used for heating the water. In all such cases the heat-exchanger should be used. In larger installations, where water pumps and circulating pumps are large, both or either can be built as a condensing engine, besides utilizing the expansion of the steam in the steam cylinder. The cooling water after having gone through the refrigerating apparatus, having taken up the heat of absorption there while circulating through the coils in A and B, can be used for the steam condenser, and afterward having there taken up more heat yet, combined or not combined with the condensed steam, be used for boiler-feeding and the surplus used in the heating vessel.

Warm water which is produced in many manufacturing processes can be used with my invention for refrigeration, and the refrigeration would be obtained without any expenditure of fuel. In the household the warm water from the heater or boiler in the kitchen can be used, or a gas-flame, petroleum stove, &c., bringing this kind of refrigerator within easy reach of everybody without causing any apprehension of danger on account of the low temperatures used; besides, all tanks can be constructed much lighter and cheaper for low pressure. Since a given weight of water or any other liquid will increase in volume when gas or vapor is absorbed, and decrease in volume when the gas or vapor is expelled, the rising or lowering of the level could be used to transmit power for moving the cocks or valves &c., by attaching a rod to the float, and passing such rod through a stuffing-box provided in the bottom of such vessel and then connecting the rod by means of a bell-crank to the cock or other levers or by connecting it direct to these levers. Or a diaphragm plate of rubber, steel or other flexible material could be provided in the bottom or top of any of the vessels, which counter-weighted will be acted upon by the pressure, and thus furnish the impetus or power direct to move the different levers or reversing motions. Figs. 6 and 7 show such modification. In Fig. 5 the ball which serves as the weight is not permitted to roll. It is set fast on the lever which is raised by the increase of pressure and lowered by its decrease. In this modification three separate cocks are employed to perform the functions of the single eight way cock I in Fig. 3. I prefer the construction in Fig. 3 but this modification may serve. In cases where the expense will be warranted, to make the operation continuous, I can do so by employing two or more sets of the apparatus.

For regulating the motion of the cold as well as the hot water, a governor may be used in connection with the water motor and cock, or, if pump is used for cold water, in connection with the pump so as to regulate the speed automatically.

I claim as my invention:

1. In a refrigerating apparatus having a heating vessel B and absorption vessel D, the cooler C interposed between the heater and the absorption vessel and mounted at a higher level, in combination therewith and with a cock I having a multiplicity of passages adapted to change the relations of the connected pipes $a'$ $a^2$ $a^5$ $a^6$ $c^2$ $c^6$ $c^7$ $c^9$ and with the piston $m$ actuated by the pressure of the gas within the apparatus, and connections therefrom to operate such cock automatically at proper intervals, arranged for joint operation substantially as herein specified.

2. The combination with the condensing and the expansion vessel, and the two vessels adapted to act alternately as heating and absorption vessels, of the sources of supply for the heating and for the cooling water, the eight-way cock and means for automatically turning it at intervals, and pipe connections between the cock and various vessels, arranged as described.

In testimony whereof I have hereunto set my hand, at New York city, this 29th day of May, 1888, in the presence of two subscribing witnesses.

ALFRED SIEBERT.

Witnesses:
CHARLES R. SEARLE,
H. A. JOHNSTONE.